Oct. 14, 1969   W. S. NAGEL   3,472,346
THREE SPRING CLUTCH
Filed Oct. 24, 1967   2 Sheets-Sheet 1

INVENTOR.
WILLIAM S. NAGEL
BY
Woodhams, Blanchard & Flynn
ATTORNEYS

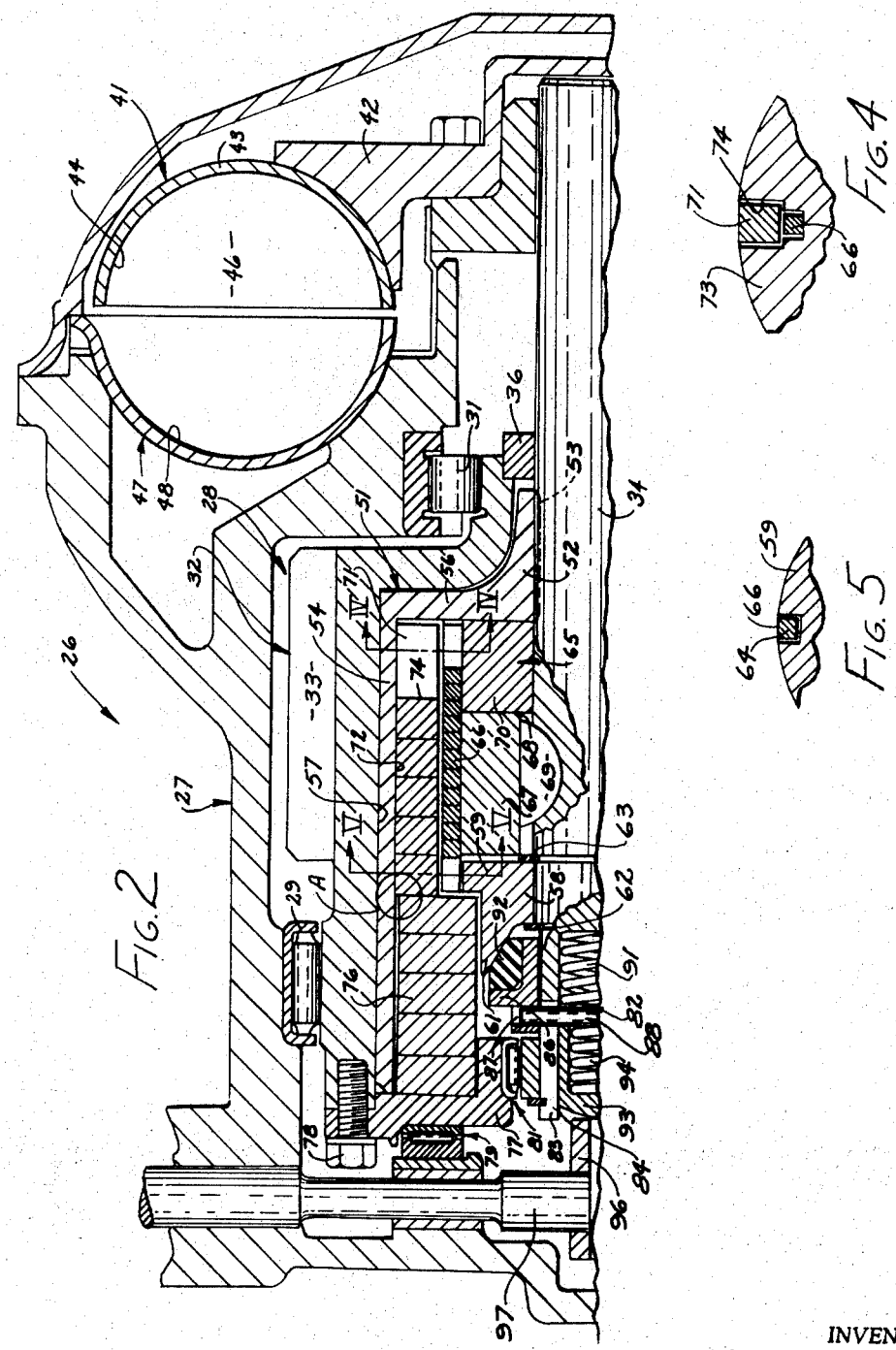

United States Patent Office 3,472,346
Patented Oct. 14, 1969

3,472,346
THREE SPRING CLUTCH
William S. Nagel, Franklin, Mich., assignor to Eaton Yale & Towne Inc., Cleveland, Ohio, a corporation of Ohio
Filed Oct. 24, 1967, Ser. No. 677,640
Int. Cl. F16d 23/00
U.S. Cl. 192—35                                    12 Claims

ABSTRACT OF THE DISCLOSURE

A clutch device operable between first and second independent rotatable members wherein said first rotatable member has clutch means and a sleeve fixed thereto. Said clutch means is actuable to connect one end of a first torque transfer element to said first rotatable element. One end of a first clutch spring is connected to the other end of said first torque transfer element, the other end of said first spring is connected to one end of a second torque transfer element. The other end of said second torque transfer element is connected to one end of a second spring member which has first and second segments of differing resiliency. The other end of said second spring member is connected to said second rotatable member. Said sleeve is located adjacent and radially between said second spring member and said second rotatable member, said first segment of said second spring member being radially spaced from said sleeve a greater distance than said second segment so that engagement of said clutch means applies a torque to said first torque transfer element and thence to said first spring member to further cause said first spring member to engage said first rotatable member to effect a driving of same and to apply a torque to said second torque transfer element which is sufficient to cause said second segment of said second spring to engage said sleeve to effect a further driving relationship between said first and second rotatable members. After a certain time delay, due to the aforesaid spacing between said first segment of said second spring and said sleeve, the torque becomes great enough on said first segment to distort same to cause an engagement thereof with said sleeve to effect a maximum driving connection through said sleeve between said respective rotatable members.

CROSS REFERENCE TO A RELATED APPLICATION

Ser. No. 592,705, filed Aug. 29, 1966, now Patent No. 3,367,461, which is a divisional application of Ser. No. 391,827, filed Aug. 10, 1964, now Patent No. 3,291,268.

FIELD OF THE INVENTION

This invention relates to a speed retarder unit for motor vehicles and, more particularly, relates to a clutch device operable between two independently rotatable members.

DESCRIPTION OF THE PRIOR ART

Clutches utilizing springs as the means for interconnecting a pair of independently rotatable members have been known for many years. In each instance, an attempt has been made to smooth out the transition between the frictional engagements of the respective spring members with the driven member. This has been best accomplished by the use of multiple springs or one spring of varying resiliency. One of the problems has been the fact that when the rotatable member has not been brought up to speed sufficiently by engagement of, for example, the first and second spring members of a three spring unit, the transition from the engagement of the second spring member to the frictional engagement of the third spring member often results in a severe jerk exerted on the driven member since the engagement of the third spring member constitutes the maximum frictional engaging member in the system. This jerk is due to the fact that the spring members differ in size and are capable of differing frictional engagements with the rotatable member. As a result, the engagement of the first and second spring members is slight and slips respect to the driven member. When the third spring member engages the driven member, said engagement is appreciably larger than that of the combined first and second spring members so as to cause a rather sudden change in the speed of rotation of the driven member causing a severe jerk in the output of the driven member.

Attempts have been made to smooth out the jerking sensation by graduating the resiliency of the spring members so that their resiliency decreases in progressive order from coil to coil from the beginning of the weakest coil through the end of the strongest coil. This, therefore, has resulted in each of the individual coils of the spring members engaging the driven rotatable member one at a time. Nevertheless, there still exists the problem that the driven member is not sufficiently brought up to speed by the time the strongest spring member which supplies the true drive fully engages same. As a result, the jerking sensation has continued to exist in the output of the driven member when the spring containing the strongest coils frictionally engages same.

In the spring clutch assembly disclosed in my aforementioned copending application, Ser. No. 592,705, now Patent No. 3,367,461 a two spring clutch is provided which operatively engages and disengages a turbine rotor from a drive member. That particular assembly operates satisfactorily under most operating conditions. However, there still remain applications wherein a smooth transition is desired between the engagement of the respective spring members. The system of the present invention is better capable of providing the smooth transition.

Accordingly, the objects of this invention are:

(1) To provide a clutch device in which the transition between the engagement of a plurality of spring members contained therein with a driven member is carried out smoothly.

(2) To further provide a clutch device, as aforesaid, in which a time delay occurs between the engagement of a pair of spring members to a driven member so that as a result of the engagement of the first spring members the anngular velocity of the driving member is substantially achieved by the driven member prior to the engagement of the second spring member.

Other objects and purposes of this invention will be apparent to persons acquainted with apparatus of this general type upon reading the following specification and inspecting the accompanying drawings.

BRIEF DESCRIPTION OF THE DRAWINGS

FIGURE 2 is an enlarged fragmentary central cross-sectional view of the clutch unit embodying the invention.

FIGURE 4 is a fragmentary sectional view taken along the line IV—IV in FIGURE 2.

FIGURE 5 is a fragmentary sectional view taken along the line V—V in FIGURE 2.

Certain terminology will be used in the following description for convenience in reference only and will not be limiting. The words "upwardly," "downwardly," "rightwardly" and "leftwardly" will designate directions with reference being had to FIGURE 1. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

In general, the objects and purposes of the invention are met by providing clutch means operable between first and second independently rotatable members wherein resilient means driven by said second rotatable member has first and second segments of differing resiliency radially spaced from a sleeve fixed to said first rotatable member, said first segment of said resilient means being radially spaced from said sleeve a greater distance than said second segment so that a time delay will occur after said second segment engages said sleeve and before said first segment engages said sleeve.

DETAILED DESCRIPTION

The subject matter of this application arose out of a development disclosed in my copending application, Ser. No. 391,827, filed Aug. 10, 1964, now Patent No. 3,291,268, and later divided into application Ser. No. 592,705, filed Aug. 29, 1966, now Patent No. 3,367,461. In its narrower aspects, the subject matter of the present invention has been designed for use with a retarder set forth in the aforesaid copending application. Particularly, said narrower aspects of the invention are directed toward a clutch assembly embodying the invention as utilized in such environment and in combination with the retarder as set forth in said application. In its broader aspects, however, the subject matter of the present invention is applicable for use with other types of mechanisms and it will, accordingly, be recognized that insofar as such broader aspects are concerned, the use herein of the particular retarder of said application is illustrative only and not limiting.

Figure 1:
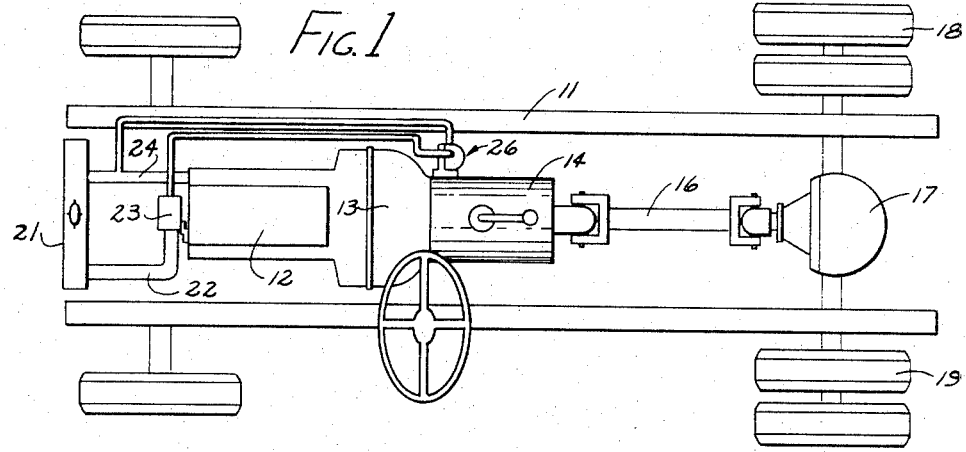
FIGURE 1 is a schematic plan view of an automotive vehicle showing a retarder unit having a clutch unit therein embodying the invention.

Looking first at FIGURE 1, there is shown a vehicle, such as a truck, of any type having a frame 11, an engine 12 driving through a clutch 13 and transmission 14 to a propeller shaft 16 and thence through a differential 17 to drive wheels indicated generally at 18 and 19. A heat exchanger, or radiator, 21 is indicated as connected conventionally at the forward end of the vehicle and connected from its lower end by a conduit 22 to the water pump 23 which discharges into the lower end of the engine water jacket in the usual manner. A conduit 24 connects the upper end of the engine water jacket to the upper end of the radiator 21.

All of the foregoing is conventional and has been illustrated solely to provide an environment for the invention.

Turning now to the retarder unit and clutch assembly itself, the same being indicated generally at 26 in FIGURE 1 and, as more fully illustrated in FIGURE 2, consists of a housing 27 having suitable means (not shown) for mounting said housing to the side of the transmission 14. The housing 27 has a gear chamber 28 therewithin and includes bearings 29 and 31 which are of any conventional type and supported in any convenient manner which will be readily apparent to those skilled in the art and therefore needs no further detailing.

A gear 32 is supported by the bearings 29 and 31 and carries peripherally formed thereon suitable teeth 33 which are driven, for example, by a gear (not shown) connected to the transmission 14. A spindle 34 is supported within and by the gear 32 in part by the bushing 36 and in part by the clutch mechanism hereinafter described.

The turbine rotor 41 is fastened, in this embodiment, to the right end of the spindle 34 and consists of a center plate 42 and blade means 43. The blade means are formed in any convenient and conventional manner which, in this embodiment, consists of an annular trough-like element 44 of semicircular cross section and containing a plurality of partitions of which one is shown in FIGURE 2 at 46. These partitions can be arranged angularly at about 45 degrees with respect to the general plane of the trough-like element 44, if desired, and can also be related to the direction of rotation of the rotor. The stator 47 of the retarder unit 26 comprises an annular trough-like element 48 which is similar to the trough-like element 44, is arranged in opposition thereto and is suitably fastened, such as by welding, to the housing 27.

A clutch fitting 51 is arranged onto the spindle 34 in a conventional manner and comprises a cylindrical hub 52 which is splined to the splines 53, a radially spaced cylindrical flange 54 and a radially extending web 56 interconnecting the hub 52 and flange 54. The clutch fitting 51 is rotatable with the spindle 34 and the outer surface of the cylindrical flange 54 is spaced closely adjacent the central opening 57 of the gear 32 but radially spaced therefrom. If desired, the clutch fitting 51A (FIGURE 6) may be provided with longitudinal slots 60.

An annular first energizing unit 58 is arranged on the spindle 34 and comprises a radial flange 59 and an axial annular flange 61 which extends leftwardly from the flange 59. The first energizing unit 58 is arranged for free rotative movement with respect to the clutch fitting 51 and spindle 34 and is prevented from relative axial movement by the snap rings 62 and 63. The end 64 of a relatively light first clutch spring 66 is secured in a notch in the radially outer surface of the radial flange 59 as illustrated in FIGURE 5.

An annular sleeve 67 having an internal keyway 68 is keyed to the spindle 34 by a key 69 secured thereto and projecting radially outwardly and into engagement with the internal keyway 68. In this particular embodiment, the sleeve 67 is positioned rightwardly of the first energizing unit 58 and separated therefrom by the snap ring 63.

A second energizing unit 65 is arranged next rightwardly of the sleeve 67 and comprises a body part 70 surrounding the spindle 34 and is rotatable with respect thereto. The first clutch spring 66 is telescoped over the outer surface of the sleeve 67 and is secured at its other end to the second energizing ring 65. Thus, when ring 58 initiates a slowing of rotation of the clutch spring 66, the hand of said spring is such that the drag provided by the subsequent connection to the turbine rotor 41 will effect a tightening of said spring 66 onto the sleeve 67.

Figure 3:
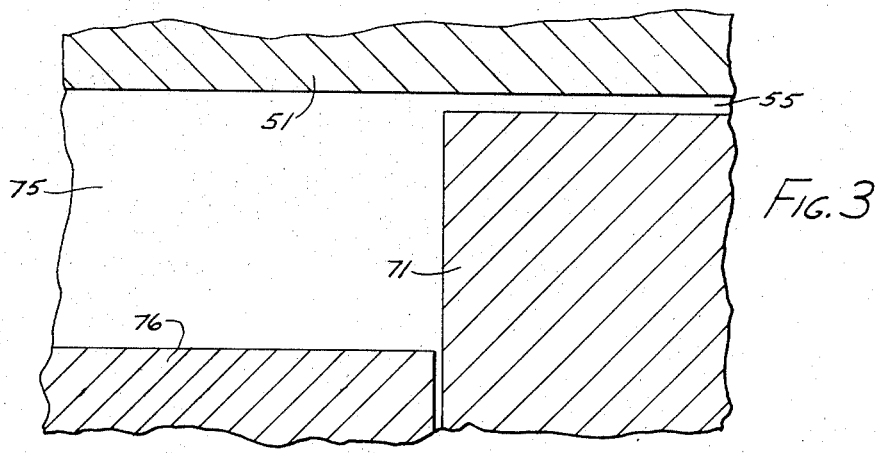
FIGURE 3 is an enlarged sectional view of the area bounded by a circle labeled "A" in FIGURE 2.

A second spring 71, preferably substantially larger than the first spring 66, is arranged within the annular chamber 72 between the flange 54 and the first spring 66. The second energizing unit 65 has a notch 74 (FIGURE 4) in the radially outer surface. The notch 74 receives the spring 71 to prevent relative rotation therebetween. In this particular embodiment, the spring 71 is spaced radially inwardly from the cylindrical flange 54 to define a clearance 55 of approximately .004 inch. An enlarged showing of this spacing is illustrated in enlarged detail in FIGURE 3.

A third spring 76 is preferably integrally secured to the left end of the second spring 71 and, in this embodiment, extends coaxially leftwardly therefrom. The third spring 76 is preferably substantially larger than the second spring 71. In this particular embodiment, the spring 76 is secured at its left end to an annular ring 77 which is secured by a plurality of bolts 78 to the gear 32 and is spaced radially inwardly from the flange 54 a greater distance than the distance between said flange and second spring 71. In this embodiment, the clearance 75 (FIGURE 3) is approximately .060 inch. The ring 77 is arranged for supporting a pair of bearings 79 and 81 which are of any conventional type and are supported in any convenient manner which will be readily apparent to those skilled in the art and therefore needs no detailing.

The spindle 34 is provided with a recess 82 extending coaxially into the left end thereof. A pair of diametrically opposed slots 83 (only one of which is shown in FIGURE 2) are disposed in the wall 84 of the recess 82 and extend longitudinally thereof. The outer surface of the wall 84 supports one side of the bearing 81. Similarly, the outer surface of the wall 84 supports a pressure equalizing ring 86 which is slideable thereon. The pressure equalizing ring 86 is provided with a pair of diametrically opposed openings 87 (only one is shown in FIGURE 2) which are held in alignment with the slots 83 by a pin 88 which is slideably receivable in the slot 83 and is snugly receivable in the openings 87 as by a press fit. A spring 91 is positioned within the recess 82 and bears against the blind end thereof at one end, and at the other end against the pin 88 to cause, in this embodiment, said pin and said pressure equalizing ring 86 to be biased in a leftward direction.

A clutch ring 92 is arranged on and for movement with the rightward face of the pressure equalizing ring 86. Said clutch ring 92 is preferably made of high-friction material, such as any of the many plastic-and-fiber materials made for this purpose.

A cup-shaped piston element 93 is disposed in the recess 82 to the leftward side of the pin 88. The outer diameter of the piston element 93 is preferably slightly less than the inner diameter of the recess 82 so that it can slide therewithin. The piston is biased in a leftward direction by a spring 94 which, at one end, bears against the pin 88 and at the other end against the piston.

Any suitable mechanical means, such as a rotatable cam 96 mounted on and for rotation with a shaft 97, is provided for urging the piston 93 against the spring 94 and thereby urging the pin 88 and clutch ring 92 rightwardly. Any convenient means (not shown) can be provided for enabling the operator to rotate the shaft 97.

OPERATION

Although the operation of the device embodying the invention has been indicated somewhat above, said operation will be described in detail hereinbelow for a better understanding of the invention.

When the cam 96 is in such position as to permit the piston 93 to move leftwardly under the urging of the spring 94, the clutch ring 92 does not engage the first energizing unit 58 and the parts are in a nondriving relationship. Under these conditions, rotation of the gear 32 carries with it, rotatingly, the spring retainer ring 77, the springs 76 and 74, the second energizing unit 65, the spring 66 and the first energizing unit 58. The clutch fitting ring 51, clutch ring 92, pressure equalizing ring 86 and the parts associated therewith are rotatably fixed with respect to the spindle 34 and these parts do not rotate due to the lack of a driving torque.

As stated above, the clutch mechanism embodying the invention is designed for use with a retarder mechanism in vehicles such as trucks. When the operator of the vehicle desires to use the retarder, he can effect by any convenient means (not shown) a rotation of the shaft 97 which rotates the cam 96 to urge the piston 93 rightwardly against the spring 94. This effects a rightward movement of the pin 88, pressure-equalizing ring 86 and the clutch ring 92 to cause engagement thereof against the first energizing unit 58 for urging a rotation thereof. The rotational torque thus applied to the first energizing unit 58 may be very light and, in fact, needs to be only sufficient to cause the relatively light spring 66 to wrap around and engage the sleeve 67.

Since said spring 66 is rotating relatively rapidly and the spindle 34 is substantially nonrotating, a wide speed differential will exist therebetween so that even a relatively light touching of the leftward end of said spring 66 againt the sleeve 67 will effect an extremely rapid wrapping and engagement of said sleeve by said spring 66. The resistance to rotation of the spindle 34 by its connection to the rotor 41 will restrain it against the rotation imposed onto it by its relationship with the gear 32 and thereby effect a relative rotational torque therebetween. This effects an expansion of the second spring 71 outwardly against the cylindrical flange 54 through the second energizing unit 65 and effects an even stronger engagement between the spindle 34 and the gear 32.

When the spring 66 has become tightly wrapped around the sleeve 67, the rightward end thereof applies a resistance to rotation to the second energizing unit 65 to restrain said second energizing unit against the rotational torque imposed onto it by its relationship with the gear 32 and third spring 76 to thereby effect a relative rotational torque therebetween. Since the spring 71 projects into the opening 74 in the second energizing unit 65, the rightward end of the spring 71 is restrained against the rotation imposed onto it by its relationship with the gear 32 and third spring 76. As a result, an expansion will occur of the second spring 71 radially outwardly against the cylindrical flange 54. Since the spring 71 is rotating relatively rapidly and the spindle 34 is rotating slightly due to the engagement of the spring 66 with the sleeve 67, a relatively wide speed differential exists therebetween so that a relatively light touching of the rightward end of the spring 71 against the flange 54 will effect a rapidly increasing, though slipping engagement of the spring 71 against said flange 54. This raises the speed of rotation of the spindle 34 toward that of the gear 32.

During this time, however, the spring 76 does not expand sufficiently to come into any meaningful engagement with the flange 54 due to the clearance 75 between the outer surface thereof and the inner surface of the flange 54. Thus, while there may be some tendency for the spring 76 to expand, said expansion is not great enough to cause it to come into any effective engagement with the flange 54.

This will allow enough time to elapse so that the spindle 34 is essentially brought up to a speed equal to, or almost equal to, the speed of the gear 32 by the time that the torque is great enough to cause the spring 76 to expand into engagement with the flange 54 and the flange 54 will be essentially rotating at a speed only, at most, slightly less than the gear 32. Thus, the change in speed of the flange 54 and spindle 34 after the spring 76 engages same will be insignificant and there will be essentially no resulting jerk felt by the operator within the vehicle.

The operation set forth above effects a driving relationship from the gear 32 through the spring retainer ring 77, through the springs 76 and 71 and flange 54 to the clutch fitting 51 and thence to the spindle 34. The transition from a condition wherein the spindle is essentially stationary to a condition where the spindle is rotating at the same speed as the gear 32 is relatively smooth and no jerking sensations as the respective springs engage the spindle 34 can be felt by the operator of the vehicle.

When it is desired to declutch or uncouple the retarder 26, the shaft 97 is rotated to move the cam 96 from the leftward side of the piston 93 so that the spring 94 can move the pin 88, pressure equalizing ring 86 and clutch ring 92 leftwardly out of engagement with the first energizing ring 58. The torsional characteristic of spring 66 is such that disengagement of the clutch ring 92 from the first energizing ring 58 allows said spring to unwind and thus become frictionally released from the sleeve 67 and spindle 34.

Figure 6:
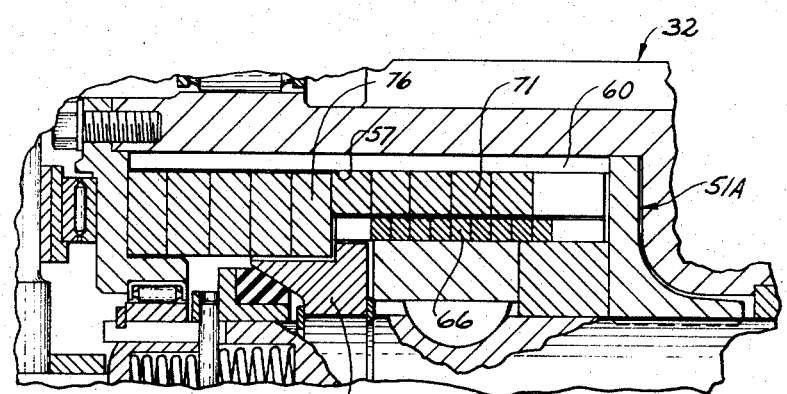
FIGURE 6 is a fragmentary sectional view of a modified clutch fitting.

In the embodiment illustrated in FIGURE 6, the clutch fitting 51A having the longitudinal slots 60 therein is permitted to expand upon engagement therewith of the second and third spring members 71 and 76, respectively, into engagement with the inner surface of the center opening 57 in the gear 32. Thus, a driving engagement will exist between the clutch fitting 51A and the gear 32 as well as a driving engagement between the gear 32 through the spring members 71 and 76 to the clutch fitting 51A.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A clutch device operable between driving and driven rotatable members, the combination comprising:
   resilient means and means driven by said driving rotatable member for driving enagement with said resilient means for effecting rotation of said resilient means, said resilient means having first and second segments of differing resiliency;
   clutch means, one side of which is fixed with respect to said driven rotable member and having a sleeve portion located adjacent and externally telescoping said resilient means, said first and second segments of said resilient means being both engageable with said sleeve portion;
   energizing means for rotatably driving same;
   engagement means actuable to couple said energizing means to said driven rotatable member;
   whereby actuation of said engagement means connects said energizing means to said driven rotatable member which applies a torque between the ends of said resilient means and as said energizing means resists the rotation imposed thereon by said engagement means, same torsionally distorts said first segment of said resilient means sufficiently to cause same to effect a limited driving connection with the other side of said clutch means to effect a limited driving connection between said driven rotatable member and said driving rotable member and after said second segment has fully engaged said driven rotatable member, same torsionally distorts said second segment of said resilient means sufficiently to cause same to effect a maximum driving connection with the other side of said clutch means to effect a maximum driving connection between said driven rotatable member and said driving rotatable member through said clutch means.

2. The device defined in claim 1, wherein said driving rotatable member is telescoped over said driven rotatable member for defining an annular space therebetween and wherein said resilient means, said energizing means, and said clutch means are all in telescoped relationship to each other and located at least substantially within said annular space.

3. A clutch device operable between a first rotatable member and a second rotatable member, comprising in combination:
   first energizing means;
   first resilient means and means for engaging one end of same with said first energizing means;
   second energizing means and means for engaging same with the opposite end of said first resilient means;
   second and third resilient means and means engaging said second rotatable member to one end of said second and third resilient means and means for engaging the other end of said second and third resilient means to said second energizing means;
   clutch means, one side of which is fixed for rotation with said first rotatable member;
   disconnectible engaging means actuatable to engage said first energizing means with said first rotatable member;
   whereby said second rotatable member drives said first, second and third resilient means and said first and second energizing means so that actuation of said disconnectible engaging means connects said first energizing means with said first rotatable member which applies a torque between the ends of said first resilient means and as said first energizing means resists the rotation imposed onto it by said first resilient means, it torsionally distorts said first resilient means sufficiently to cause same to effect a limited driving connection with the other side of said clutch means to effect a like driving connection between said first rotatable member and said second rotatable member and as said first resilient means resists rotation imposed onto it by said second energizing means, said second energizing means resists rotation imposed onto it by said second resilient means and applies a torque between the end of said second resilient means and as said second resilient means resists rotation imposed onto it by said third resilient means, it causes a torsional distortion of said second resilient means to effect a further but limited driving connection greater than that of said first resilient means with the other side of said clutch means to effect a like driving connection between said first rotatable member and said second rotatable member and as said third resilient means resists rotation imposed onto it by said second rotatable member, it torsionally distorts said third resilient means to effect a maximum driving connection with the other side of said clutch means to effect a like driving connection between said first rotatable member and said second rotatable member through said clutch means.

4. The clutch device defined in claim 3, wherein said second and third resilient means have differing resiliencies.

5. The clutch device defined in claim 3, wherein said second rotatable member is telescoped over said first rotatable member for defining an annular space therebetween and wherein said first, second and third resilient means are in telescoped relationship to each other and said first and second energizing means being disposed at the ends of said telescoped relationship, said first, second and third resilient means and said first and second energizing means being located at least substantially within said annular space.

6. The clutch device defined in claim 5, wherein said clutch means includes an inner flange which is drivingly engaged with said first rotatable member and an outer flange which is telescoped between said second rotatable member and said second and third resilient means;
   whereby torsional distortion of said second and third resilient means causes same to contact said outer flange of said clutch means to effect the maximum driving connection between said first rotatable member and said second rotatable member.

7. The clutch device defined in claim 6, wherein said third resilient means is spaced radially inwardly from said outer flange a distance greater than the radially inwardly spacing of said second resilient means.

8. The clutch device defined in claim 7, wherein said outer flange is disposed closely adjacent the inner surface of said second rotatable member and has a plurality of longitudinal slots;
   whereby distortion of said second and third resilient means produces expansion of said outer flange thereby producing a driving connection of said second rotatable member and said outer flange as well as the driving connection between said second and third resilient means and said outer flange.

9. The clutch device defined in claim 7, wherein said outer flange is spaced from the inner surface of said second rotatable member;
   whereby torsional distortion of said third resilient means effects the maximum driving connection between said third resilient means and said outer flange.

10. The clutch device defined in claim 3, wherein said disconnectible engaging means comprises:
    a clutch pressure plate and spring means, said plate being urged into disengagement by said spring means;

rotatable camming means capable of overcoming said spring means thereby urging said clutch pressure plate into driving engagement with said first energizing means.

11. The clutch device defined in claim 1, including surface means also driven by said driving member externally overlapping said clutch means and positioned closely adjacent thereto; and wherein said sleeve portion has a plurality of longitudinal slots therein for facilitating an expansion of said sleeve portion radially outwardly into engagement with said surface means;

whereby a distortion of said resilient means will move said sleeve portion into engagement with said surface means to supplement the driving connection between said driven rotatable member and said driving rotatable member.

12. The clutch device defined in claim 1, wherein said second segment of said resilient means is spaced radially inwardly from said sleeve portion a distance greater than the radially inwardly spacing of said first segment of said resilient means.

References Cited
UNITED STATES PATENTS

| | | | |
|---|---|---|---|
| 2,052,961 | 9/1936 | Bon Ham | 192—52 |
| 2,951,568 | 9/1960 | Hungerford et al. | 192—81 |
| 2,984,325 | 5/1961 | Tomko et al. | 192—81 |
| 3,104,745 | 9/1963 | Wipke | 192—81 |
| 3,128,863 | 4/1964 | Tomko | 192—81 |
| 3,367,461 | 2/1968 | Nagel | 192—81 |

MARTIN P. SCHWADRON, Primary Examiner

L. J. PAYNE, Assistant Examiner

U.S. Cl. X.R.

192—52, 77, 48.7, 48.92